United States Patent
Loo et al.

(10) Patent No.: US 11,514,267 B2
(45) Date of Patent: Nov. 29, 2022

(54) SYSTEM AND METHOD FOR PERFORMING TEST DATA MANAGEMENT

(71) Applicant: ProKarma, Inc., Beaverton, OR (US)

(72) Inventors: Tipton Loo, Redmond, WA (US); Ramanathan Sathianarayanan, San Ramon, CA (US); Vijay Ijju, Aurora, CA (US); Richard Lucas, Phoenix, AZ (US)

(73) Assignee: ProKarma, Inc., Beaverton, OR (US)

( * ) Notice: Subject to any disclaimer, the term of this patent is extended or adjusted under 35 U.S.C. 154(b) by 811 days.

(21) Appl. No.: 16/381,480

(22) Filed: Apr. 11, 2019

(65) Prior Publication Data
US 2019/0318205 A1   Oct. 17, 2019

Related U.S. Application Data

(63) Continuation of application No. 62/655,853, filed on Apr. 11, 2018.

(51) Int. Cl.
| | |
|---|---|
| *G06K 9/62* | (2022.01) |
| *G06N 5/04* | (2006.01) |
| *G06N 20/00* | (2019.01) |
| *G06F 3/06* | (2006.01) |
| *G06N 5/02* | (2006.01) |

(52) U.S. Cl.
CPC ......... *G06K 9/6262* (2013.01); *G06F 3/0619* (2013.01); *G06F 3/0647* (2013.01); *G06F 3/0673* (2013.01); *G06K 9/6257* (2013.01); *G06N 5/022* (2013.01); *G06N 5/04* (2013.01); *G06N 20/00* (2019.01)

(58) Field of Classification Search
CPC .......................... G06F 2015/765; G06F 16/217
USPC ................................................. 382/128; 705/2
See application file for complete search history.

(56) References Cited

U.S. PATENT DOCUMENTS

| | | | |
|---|---|---|---|
| 4,841,456 | A | 6/1989 | Hogan et al. |
| 9,280,401 | B2 | 3/2016 | LaCivita et al. |
| 9,494,492 | B2 | 11/2016 | Brunschwig et al. |
| 9,934,131 | B2 | 4/2018 | Kalech et al. |
| 2004/0107173 | A1 | 6/2004 | Cheng |

(Continued)

*Primary Examiner* — Kiet M Doan
(74) *Attorney, Agent, or Firm* — Morgan, Lewis & Bockius LLP

(57) ABSTRACT

A system for performing test data management is disclosed. The system includes a data library having one or more databases, the one or more databases undergo a onetime data transfer to a data store, a performing test data management non-transitory storage media residing on the one or more databases, the performing test data management non-transitory storage media includes a means for performing artificial intelligence that resides on the performing test data management non-transitory storage media, a processor system, and a plurality of components and functions residing on the performing test data management non-transitory storage media, the components and functions include a first data transfer function, a data explorer component, a second data transfer function, a data modeler component, a third data transfer function, a data validation component, a fourth data transfer function, a main transfer function, and a data generator component. The system includes a corresponding method as well.

7 Claims, 1 Drawing Sheet

(56) References Cited

U.S. PATENT DOCUMENTS

2017/0068614 A1     2/2017   Jayaraman et al.
2018/0144465 A1*   5/2018   Hsieh ..................... G06N 3/08

\* cited by examiner

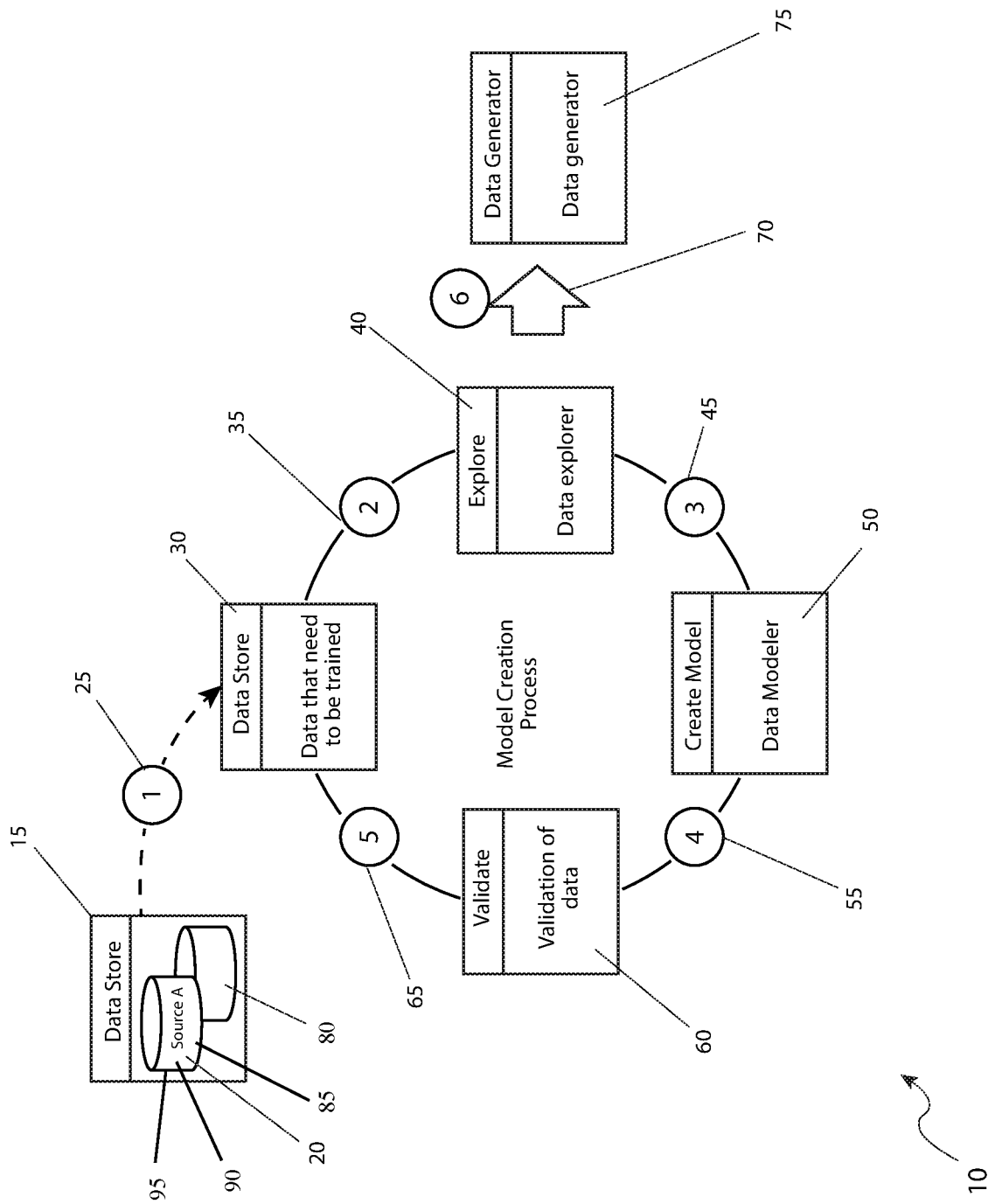

SYSTEM AND METHOD FOR PERFORMING TEST DATA MANAGEMENT

RELATED APPLICATIONS

The present application claims the benefit of U.S. Provisional Patent Application 62/655,853 filed on Apr. 11, 2018, the entire disclosure of which is incorporated by reference.

FIELD OF THE INVENTION

The present invention relates generally to a system and method for performing data management. More specifically, the present invention relates generally to a system and method for performing test data management.

BACKGROUND OF THE INVENTION

The practice of TDM (Test Data Management) has recently been granted a significant role within the testing platform in most institutions. While the practice of testing has been a crucial part of the software development life cycle, test data has merely been a tangential part of the effort thus far. However, it is now widely recognized that test data is absolutely essential for the success of any testing.

Accordingly, there exists a need for a system and method for performing test data management for creating additional data sets for consumption by testers.

SUMMARY OF THE INVENTION

It is thus a desired object of the present invention to provide a system for performing test data management, comprising a data library which has one or more databases with each database undergoing a onetime data transfer to a data store and a performing test data management non-transitory storage media residing on the one or more databases. The performing test data management non-transitory storage media includes a means for performing artificial intelligence that resides on the performing test data management non-transitory storage media. The system also comprises a processor system which is responsible for fetching, decoding, executing and writing back information that it receives from the performing test data management non-transitory storage media. The system also comprises a plurality of components and functions which reside on the performing test data management non-transitory storage media. The components and functions include a first data transfer function, a data explorer component, a second data transfer function, a data modeler component, a third data transfer function, a data validation component, a fourth data transfer function, a main transfer function, and a data generator component.

The first data transfer function may facilitate data transfer while the data explorer component via various programmed subroutines may be used to understand message data. The second data transfer function may pass data to the data modeler component while the data modeler component may create data models that are used for standardization and repeatability.

The third data transfer function may pass the data models to a data validation component while the data validation component may be used for validation and acceptance of the data model that is being learnt. The fourth data transfer function may be used to return the finalized data back to the data store. The main transfer function may be used to move the data to a data generator component. The data generator component may finalize usage of the data by generating additional data sets and applying patterns that were identified.

A method for performing test data management comprises of the following steps: first, obtaining a system for performing test data management; second, transferring data from the system from one or more databases of the system to a data store; third, training the transferred data in the data store; fourth, understanding the trained data; fifth, creating one or more data models that are used for standardization of the trained data; sixth, validating the one or more data models; seventh, returning the data to the data store; and last, moving the data to a data generator component. The transferring data step may avoid corruption of a data library of the system. The trained step may include various programmed subroutines that are used to understand the trained data. The returning step may include when previous data is overwritten with the revised data that has been standardized, validated and accepted. The moving step may include finalizing the usage of the data by generating additional data sets and applying a plurality of patterns that were previously identified.

Additionally, a non-transitory computer storage media having instructions stored thereon which, when executed, execute a method comprising the steps of: first, obtaining a system for performing test data management; second, transferring data from the system from one or more databases of the system to a data store; third, training the transferred data in the data store; fourth, understanding the trained data; fifth, creating one or more data models that are used for standardization of the trained data; sixth, validating the one or more data models; seventh, returning the data to the data store; and last moving the data to a data generator component. The transferring data step may avoid corruption of a data library of the system. The trained step may include various programmed subroutines that are used to understand the trained data. The returning step may include previous data which is overwritten with the revised data that has been standardized, validated and accepted. The moving step may include finalizing usage of the data by generating additional data sets and applying a plurality of patterns that were previously identified.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 illustrates a logic flow chart of a system for performing test data management, according to the preferred embodiment of the present invention.

DESCRIPTIVE KEY

10 System for performing test data management
15 Data library
20 One or more Databases
25 One-time data transfer
30 Data store
35 First data transfer function
40 Data explorer component
45 Second data transfer function
50 Data modeler component
55 Third data transfer function
60 Data validation component 65 Fourth data transfer function
70 Main transfer function
75 Data generator component
80 Processor system
85 Performing test data management non-transitory storage media
90 Means for performing artificial intelligence
95 Means for performing machine learning

DESCRIPTION OF THE INVENTION

The best mode for carrying out the invention is presented in terms of its preferred embodiment, herein depicted within FIG. 1. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention, and only one (1) particular configuration shall be shown and described for purposes of clarity and disclosure and not by way of limitation of scope. All of the implementation described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

DETAILED DESCRIPTION OF THE FIGURE

Referring now to FIG. 1, a logic flow chart view of a system for performing test data management 10 is described, according to the preferred embodiment of the present invention is disclosed. The system for performing test data management 10 (herein also described as the "system"), is utilized upon a data library 15 that includes one (1) or more databases 20. These databases 20 undergo a onetime data transfer to a data store 30. The purposes of the onetime data transfer 25 are to avoid any corruption of the data library which may or may not be used or served for other purposes in a production environment. The data store 30 then serves as the primary location for the data that requires "training" or "conditioning".

Subject data is then transferred by a first data transfer function 35 to a data explorer component 40. The data explorer component 40, via various programmed subroutines is used to understand message data. This information is then passed via a second data transfer function 45 to a data modeler component 50. The data modeler component 50 creates data models that may be used for standardization and repeatability. These models are then passed via a third data transfer function 55 to a data validation component 60 which is used for validation and acceptance of the data model that is being learnt. Finally, a fourth data transfer function 65 is used to return the finalized data back to the data store 30, where previous data is overwritten with the revised data that has been standardized, validated and accepted. A main transfer function 70 is then used to move the subject data to a data generator component 75 where based on above set of distinct components, finalize the usage of the data by generating additional data sets applying patterns that were identified in previous steps. The resultant data is then available for additional testing requirements.

The process provides for test data synthesis in a sequential but continual process. Data storage is provided by the data store 30 and data generator component 75. Data exploration is provided by the data explorer component 40. The data modeler component 50 creates data models utilized for standardization and repeatability, and the data validation component 60 validates and accepts the data model being learned. Finally, the data generator component 75 is used to generate data sets which apply patterns ascertained from the previous components/steps. The first data transfer function 35, the data explorer component 40, the second data transfer function 45, the data modeler component 50, the third data transfer function 55, the data validation component 60, the fourth data transfer function 65, the main transfer function 70, and the data generator component 75 may reside on the performing test data management non-transitory storage media 80. The processor system 85 is responsible for fetching, decoding, executing and writing back information that it receives from the coding that is present in performing test data management non-transitory storage media 80. The means for performing artificial intelligence 90 resides on the performing test data management non-transitory storage media 80 and includes a means for performing machine learning 95.

This method contrasts with the current method of manual fabrication efforts and production data acquisition. The process taught by the present invention ensures that the data itself is meaningful and allows for all tests to succeed. This is especially true for tests consisting of complex functions within the corresponding application(s). The complexity manifested within the data satisfies the function of the application being tested.

As an illustration, consider a test executing a specific complex function that may require a data set consisting of embedded logic and value driven relationship(s). Currently, there are tools that may, to a certain extent, allow specification of such relationships provided the information is available from the small and medium-sized enterprises (SME) of the source data platform. However, in the case where knowledge of the data characteristics including rules and logic of the data is absent, currently available tools do not have the capability to derive meaningful data.

As such, the present invention identifies a solution to the challenge when SME and the required knowledge of data is not available. The present invention applies artificial intelligence and machine learning. Artificial intelligence can assist in deriving synthetic data through inference by learning the structural characteristics and statistical properties of the sample data without requiring prior knowledge about the data. By exploring sufficient amount of sample data, the overall system may derive meaningful test data.

OPERATION OF THE PREFERRED EMBODIMENT

The preferred embodiment of the present invention may be utilized by the common user in a simple and effortless manner with little or no training. It is envisioned that the system 10 would be constructed in general accordance with FIG. 1.

The system 10 is utilized upon a data library 15 including one (1) or more databases 20 by initial transfer to a data store 30. A data explorer component 40, a data modeler component 50, and a data validation component 60 work in a sequential, but continuous manner upon said data store 30. Data transfer is facilitated by a first data transfer function 35, a second data transfer function 45, a third data transfer function 55, and a fourth data transfer function 65. The data generator component 75 then presents a condition in wherein the previous set of distinct components, finalize the usage of the data by generating additional data sets applying patterns that were identified in previous steps. The resultant data is then available for additional testing requirements.

The overall method includes the steps of obtaining a system for performing test data management, transferring data from the system from one or more databases of the system to a data store, training the transferred data in the data store, understanding the trained data, creating one or more data models that are used for standardization of the trained data, validating the one or more data models, returning the data to the data store, and moving the data to a data generator component.

The obtaining step includes the system for performing test data management having a processor system, one or more databases, a performing test data management non-transitory storage media, a means for performing artificial intelligence, and a plurality of components and functions residing on the non-transitory storage media. The transferring data step includes avoiding corruption of a data library of the system. The training step includes the transferred data in the data store is conditioned. The understanding step includes various programmed subroutines are used to understand the trained data. The creating step includes the one or more data models are used for repeatability of the trained data. The validating step includes accepting one or more data models. The returning step includes the previous data is overwritten with the revised data that has been standardized, validated and accepted. The moving step includes finalizing usage of the data by generating additional data sets and applying patterns that were previously identified.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A system for performing test data management, comprising:
    a data library having one or more databases, the one or more databases undergo a onetime data transfer to a data store;
    a performing test data management non-transitory storage media residing on the one or more databases, the performing test data management non-transitory storage media includes a means for performing artificial intelligence that resides on the performing test data management non-transitory storage media.

2. The system for performing test data management according to claim 1, wherein the first data transfer function facilitates data transfer.

3. The system for performing test data management according to claim 1, wherein the data explorer component via various programmed subroutines is used to understand message data.

4. The system for performing test data management according to claim 1, wherein the data validation component is used for validation and acceptance of the data model that is being learnt.

5. The system for performing test data management according to claim 1, wherein the fourth data transfer function is used to return the finalized data back to the data store.

6. The system for performing test data management according to claim 1, wherein the main transfer function is then used to move the data to a data generator component.

7. The system for performing test data management according to claim 6, wherein the data generator component finalizes usage of the data by generating additional data sets applying patterns that were identified.

\* \* \* \* \*

UNITED STATES PATENT AND TRADEMARK OFFICE
CERTIFICATE OF CORRECTION

PATENT NO. : 11,514,267 B2
APPLICATION NO. : 16/381480
DATED : November 29, 2022
INVENTOR(S) : Loo et al.

Page 1 of 1

It is certified that error appears in the above-identified patent and that said Letters Patent is hereby corrected as shown below:

In the Claims

Claim 1, Column 6, Line 17, please delete "media." and insert --media;--;

Claim 1, Column 6, between Line 17 and Line 18, please insert:
    --a processor system responsible for fetching, decoding, executing and writing back information that it receives from the performing test data management non-transitory storage media; and
    a plurality of components and functions residing on the performing test data management non-transitory storage media, the components and functions include a first data transfer function, a data explorer component, a second data transfer function, a data modeler component, a third data transfer function, a data validation component, a fourth data transfer function, a main transfer function, and a data generator component,
    wherein the second data transfer function passes data to the data modeler component;
    wherein the data modeler component creates data models that area used for standardization and repeatability;
    wherein the third data transfer function passes the data models to a data validation component.--.

Signed and Sealed this
Twenty-sixth Day of September, 2023

Katherine Kelly Vidal
*Director of the United States Patent and Trademark Office*